(12) United States Patent
Paek et al.

(10) Patent No.: US 7,773,494 B2
(45) Date of Patent: Aug. 10, 2010

(54) OPTICAL DISK DRIVE ADAPTER

(75) Inventors: Mun Cheol Paek, Daejeon (KR); Kwang Yong Kang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 629 days.

(21) Appl. No.: 11/810,894

(22) Filed: Jun. 7, 2007

(65) Prior Publication Data
US 2008/0080360 A1    Apr. 3, 2008

(30) Foreign Application Priority Data
Sep. 29, 2006    (KR)    ............... 10-2006-0096435

(51) Int. Cl.
*G11B 23/00*    (2006.01)
(52) U.S. Cl. .................................. 369/271.1
(58) Field of Classification Search ............. None
See application file for complete search history.

(56) References Cited

U.S. PATENT DOCUMENTS 5,533,000 A * 7/1996 Koizumi ............... 720/699

FOREIGN PATENT DOCUMENTS

| JP | 7-220428 | 8/1995 |
|---|---|---|
| JP | 10-125026 | 5/1998 |
| JP | 2002-175659 | 6/2002 |
| JP | 2003-123423 | 4/2003 |
| JP | 2003-123423 | 4/2004 |
| JP | 2005-251362 | 9/2005 |
| KR | 2004108267 A * | 12/2004 |
| KR | 1020040108267 A | 12/2004 |

* cited by examiner

*Primary Examiner*—Mark Blouin
(74) *Attorney, Agent, or Firm*—Blakely, Sokoloff, Taylor & Zafman

(57) ABSTRACT

Provided is an optical disk drive adapter comprising: a first rotating portion disposed at the center of an optical disk drive and installing a turntable on which a standard optical disk is mounted; a second rotating portion disposed beside the first rotating portion and installing a turntable on which a subminiature optical disk is mounted; a force transmitting portion disposed between the first rotating portion and the second rotating portion and transmitting a rotary force between the first rotating portion and the second rotating portion; and a housing supporting the entire optical disk drive adapter so that the first rotating portion, the second rotating portion, and the force transmitting portions can be rotated on their axes while maintaining their overall shape. Accordingly, without an additional subminiature optical disk drive, a subminiature optical disk can be driven using a conventional standard optical disk drive.

8 Claims, 5 Drawing Sheets

OPTICAL DISK DRIVE ADAPTER

CROSS-REFERENCE TO RELATED PATENT APPLICATION

This application claims the benefit of Korean Patent Application No. 10-2006-0096435, filed on Sep. 29, 2006, in the Korean Intellectual Property Office, the disclosure of which is incorporated herein in its entirety by reference.

BACKGROUND OF THE INVENTION

1. Field of the Invention

The present invention relates to an optical disk drive adapter, and more particularly, to an optical disk drive adapter installed in a standard optical disk drive, such as a compact disk (CD drive, a digital versatile disk (DVD) drive, or a blu-ray disk (BD), which can read a coin-sized optical disk to work the coin-sized optical disk used for a mobile system.

2. Description of the Related Art

Conventional optical disk drives are inexpensive storage devices used to read data from and write data onto disks having diameters of 12 cm and 8 cm of the standard. When compared with other storage devices, such as hard disks or flash memories, optical disks have a disadvantage of long access time but have advantages in that the insertion and removal of optical disks can be easily performed, thereby increasing portability and making mass distribution at low cost possible. Also, optical disks have a mass storage. Among the types of optical disks, read-only memory (ROM) disks can store large multimedia files such as music, movie, or text files, or mass program including games or software.

With the recent progress in mobile systems, the demand for small form factor mass storage devices has been increasing, and subminiature flash memories and hard disks are particularly in demand because of their convenience in use and mass storage. However, if the demand for ROM media is increased to enjoy music and movies and ROM media provide higher quality and performance, subminiature mobile ROM media are expected to be commercially available. In this case, subminiature optical disks may range from a coin-size to a size with a diameter of 5 cm. It is uncertain what size will be standardized.

While drives used for subminiature optical disks and standard optical disk drives can use the same pickup head theoretically, the diameters of hubs in the standard optical disk drives are generally greater than those of the subminiature optical disks, the standard optical disk drives are not suitable for the subminiature optical disks, thereby making it necessary to manufacture subminiature optical disk drives additionally. However, subminiature optical disks are difficult to manufacture, are not standardized yet, and are expected to be expensive even after being commercialized.

Combination drives that can write and read data on both standard optical disks and subminiature optical disks using two separate hubs have already been suggested. However, since the combination drives should be purchased in addition to the conventional standard optical disk drives, economic burden on users is increased and thus demand is restricted.

SUMMARY OF THE INVENTION

The present invention provides an optical disk drive adapter that enables a subminiature optical disk to be driven by a conventional standard optical disk drive.

The present invention also provides an optical disk drive adapter that follows the same standard as a standard optical disk and thus can drive a subminiature optical disk without any measures.

According to an aspect of the present invention, there is provided an optical disk drive adapter comprising: a first rotating portion disposed at the center of an optical disk drive and installing a turntable on which a standard optical disk is mounted; a second rotating portion disposed beside the first rotating portion and installing a turntable on which a subminiature optical disk is mounted; a force transmitting portion disposed between the first rotating portion and the second rotating portion and transmitting a rotary force between the first rotating portion and the second rotating portion; and a housing supporting the entire optical disk drive adapter so that the first rotating portion, the second rotating portion, and the force transmitting portions can be rotated on their axes while maintaining their overall shape.

All the first rotating portion, the second rotating portion, and the force transmitting portion may be gears.

Any one of the first rotating portion, the second rotating portion, and the force transmitting portion may be connected to a spindle motor of the optical disk drive and receive the rotary force of the spindle motor.

The first rotating portion and the second rotating portion may have the same size and may be rotated in the same direction.

A plurality of second rotating portions and force transmitting portions may be disposed and a plurality of subminiature optical disks may be mounted on the second rotating portions.

The second rotating portion may allow the subminiature optical disk to be mounted thereon using a magnetic clamp.

The optical disk drive adapter may further comprise a housing upper plate having an adapter-like shape and protecting the first rotating portion, the second rotating portion, and the force transmitting portion.

The housing upper plate may have a circular shape having the same diameter as the housing and exposing the axis of the first rotating portion and the second rotating portion.

The housing upper plate may have a circular shape or a U-shape which is partially opened.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
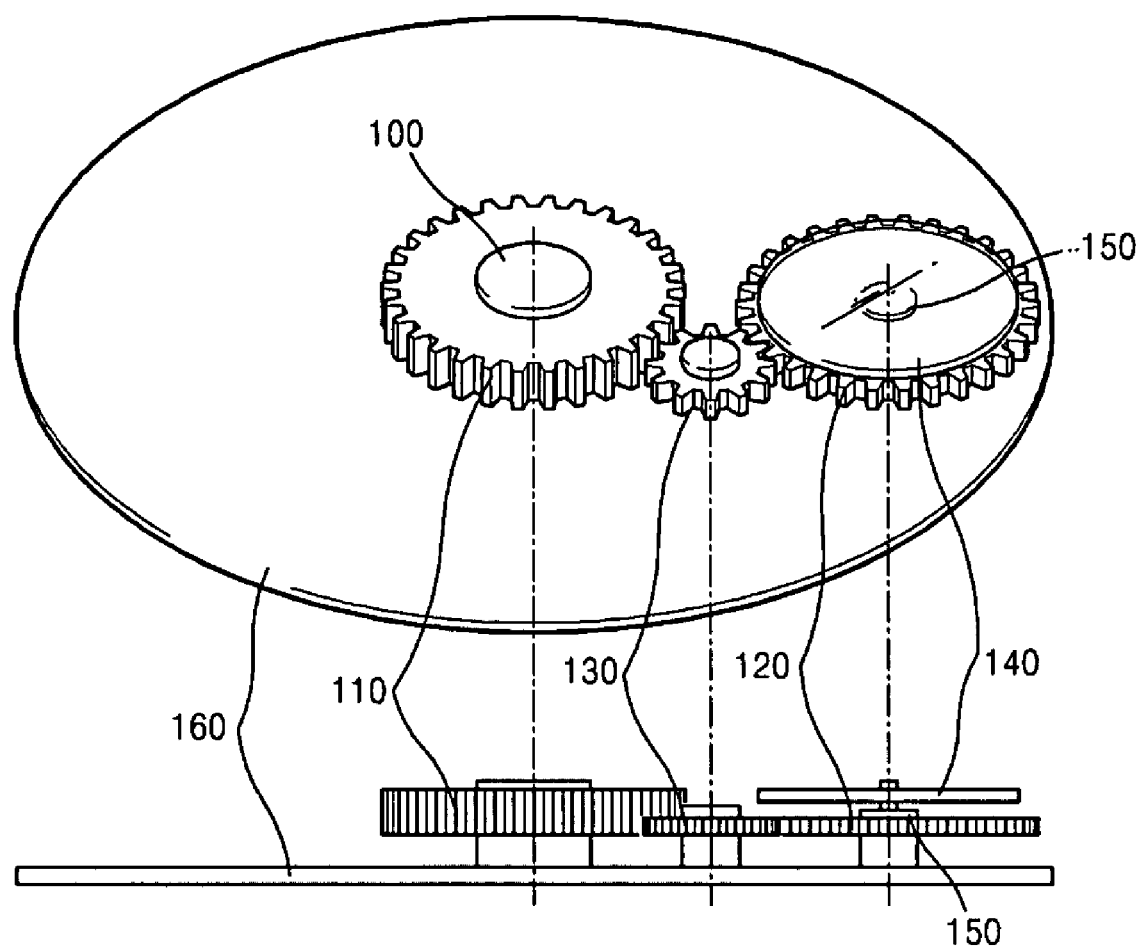
FIG. 1 is a perspective view and a cross-sectional view of an optical disk drive adapter according to an embodiment of the present invention.

FIG. 1 is a perspective view and a cross-sectional view of an optical disk drive adapter according to an embodiment of the present invention. Referring to FIG. 1, the optical disk drive adapter includes an axis portion 100, a first rotating portion 110, a second rotating portion 120, a force transmitting portion 130, a subminiature optical disk 140, a magnetic clamp 150, and a housing 160.

The axis portion 100 and the first rotating portion 110 are mounted around a spindle motor of a standard optical disk drive. The force transmitting portion 130 is connected to the first rotating portion 110. The second rotating portion 120 is rotated at the same speed in the same direction as the first rotating portion 110. The subminiature optical disk 140 is mounted on the second rotating portion 120. The magnetic clamp 150 is attracted to a turntable to hold the subminiature optical disk 140. The housing 160 supports the overall optical disk drive adapter.

The first rotating portion 110 is rotated by the rotary force of the spindle motor and has a variable size according to the size and rotational speed (rpm) of the subminiature optical disk 140. The spindle motor may be connected to the second rotating portion 120 or the force transmitting portion 130. The force transmitting portion 130 transmits the rotary force of the first rotating portion 110 to the second rotating portion 120 and has an optimal size for force transmission efficiency. While the force transmitting portion 130 is a gear in FIG. 1, the present embodiment is not limited thereto and the force transmitting portion 130 may be a belt through which a rotary force can be transmitted. The second rotating portion 120 is a gear rotated at the same speed in the same direction as the first rotating portion 110, and the number of gear teeth may be adjusted according to the standard for the rotational speed and the like of subminiature optical disks.

The second rotating portion 120 includes the turntable on which the subminiature optical disk 140 is mounted. The total thickness of the second rotating portion 120, the subminiature optical disk 140, and a space between the second rotating portion 120 and the subminiature optical disk 140 does not exceed 1.2 mm. Although the magnetic clamp 150 is attached to the second rotating portion 120 to hold the subminiature optical disk 140, they may be disposed in a more efficient method according to technological development. The magnetic clamp 150 may also be modified and improved according to the standard.

Since the first rotating portion 110, the second rotating portion 120, and the force transmitting portion 130 are rotated on their axes in FIG. 1, the cartridge-shaped housing 160 needs to support the first rotating portion 110, the second rotating portion 120, and the force transmitting portion 130. Although only the housing 160 is shown in FIG. 1 and the housing 160 has a diameter of 120 mm like a standard optical disk, the present embodiment is not limited thereto and the housing 160 may have an optimal size for efficiency.

Figure 2:
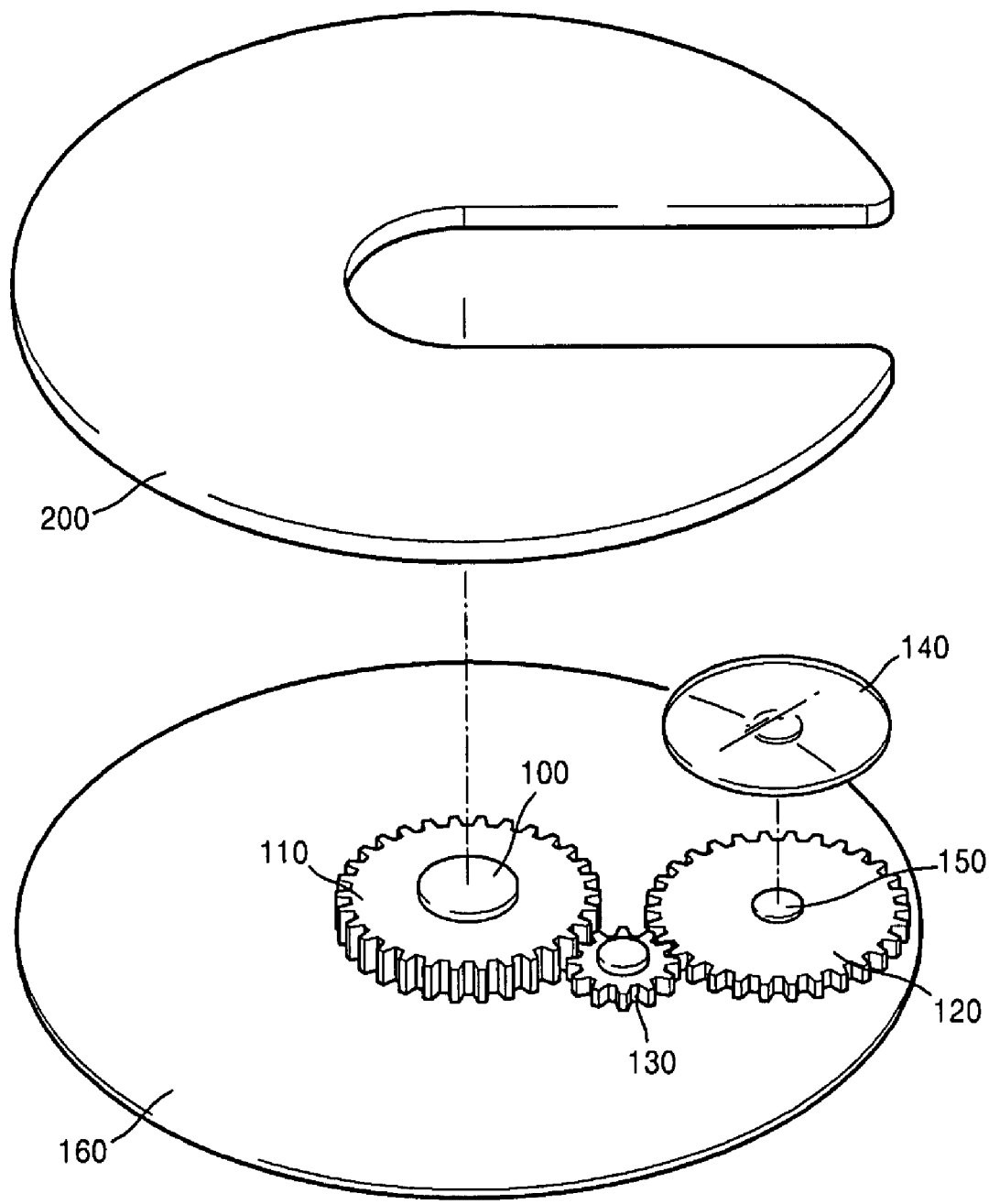
FIG. 2 is an exploded perspective view of the optical disk drive adapter of FIG. 1.

FIG. 2 is an exploded perspective view of the optical disk drive adapter of FIG. 1. Referring to FIG. 2, a housing upper plate 200 is further included in the optical disk drive adapter of FIG. 1.

The housing upper plate 200 maintains the overall shape of the optical disk drive adapter and protects the respective elements. The housing upper plate 200 has a substantially circular shape having the same diameter as the housing 160 and U-shape partially opened to expose the second rotating portion 120 on which the subminiature optical disk 140 is mounted and the first rotating portion 110 connected to the spindle motor. However, the present embodiment is not limited thereto, and the shape of the housing upper plate 200 may be changed for user convenience.

Figure 3:
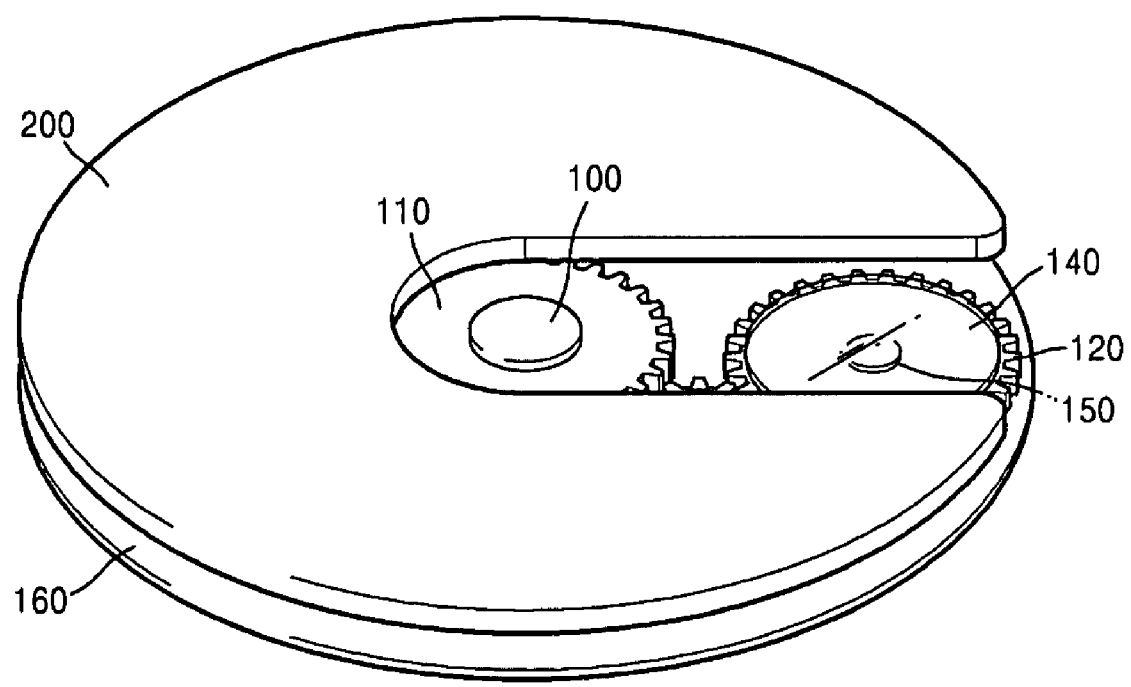
FIG. 3 is a perspective view illustrating that housing upper and lower plates of the optical disk drive adapter of FIG. 2 are coupled to each other.

FIG. 3 is a perspective view illustrating that the housing 160 and the housing upper plate 200 of FIG. 2 are coupled to each other.

The total thickness of the housing 160 and the housing upper plate 200 may have enough space for the optical disk drive adapter to be mounted on the optical disk drive and the optical disk drive adapter to protect and support the respective elements. To mount the optical disk drive adapter on the optical disk drive, the subminiature optical disk 140 is attached to the magnetic clamp 150 of the second rotating portion 120, the optical disk drive adapter is overturned with the housing 160 facing up, and the subminiature disk 140 directly faces an optical pickup. The optical pickup operates as explained later with reference to FIG. 4 and may be controlled with a sensor or artificial means.

Figure 4:
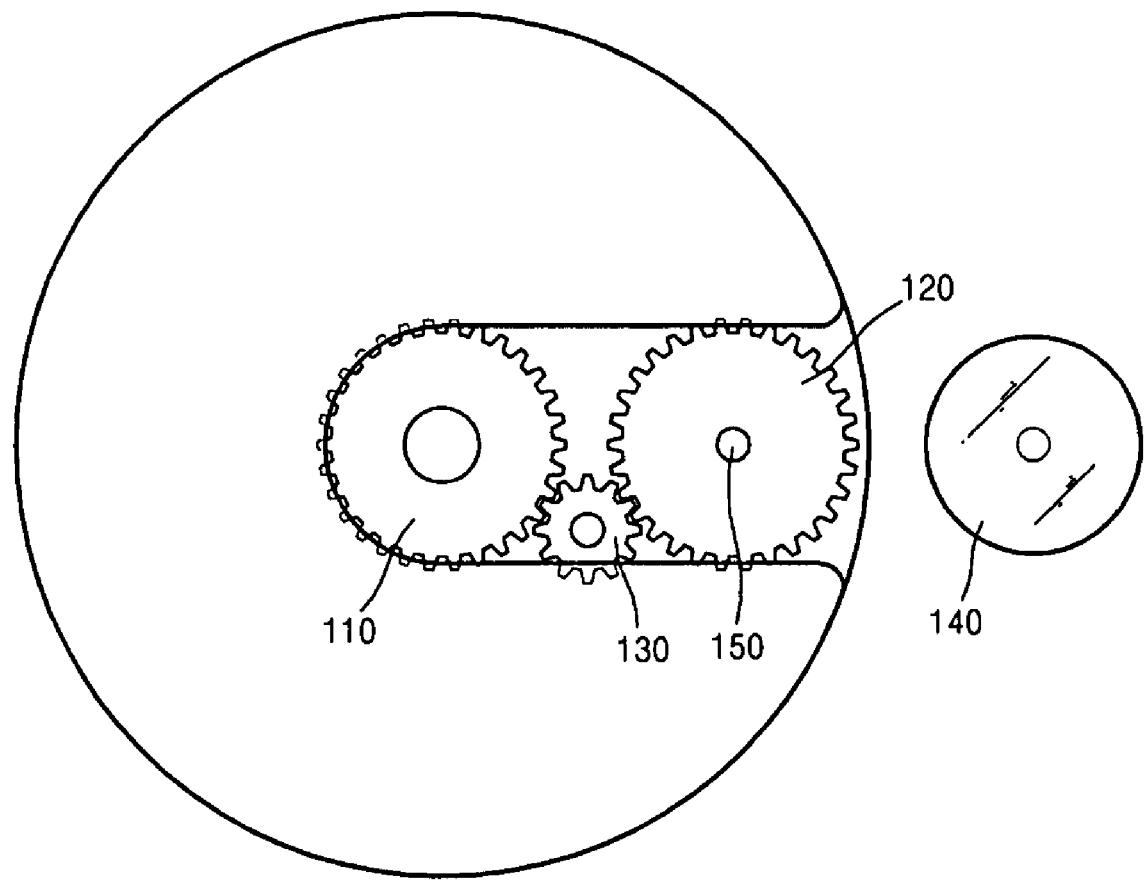
FIG. 4 is a plan view of the optical disk drive adapter of FIG. 3.
Figure 5:
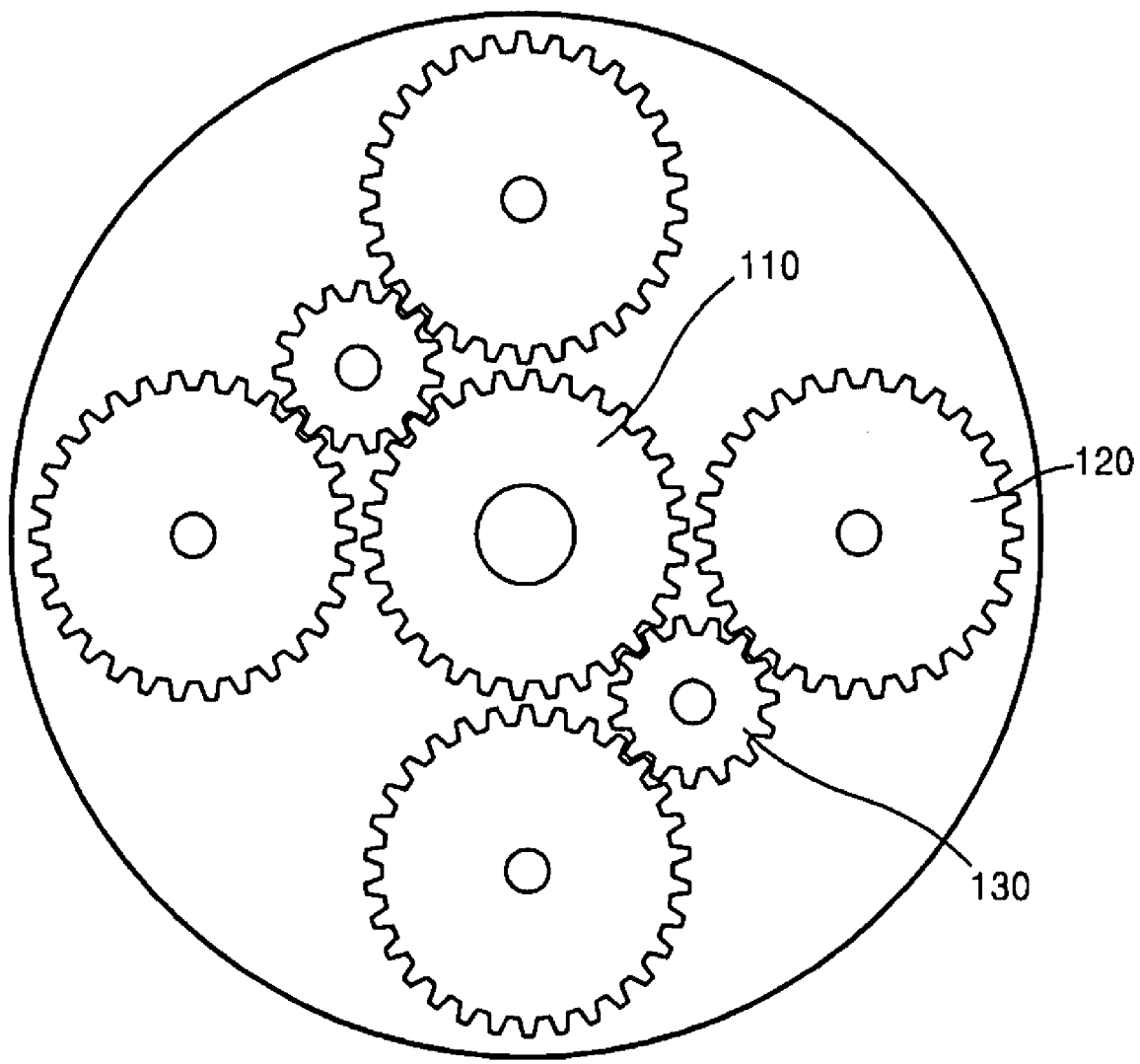
FIG. 5 is a plan view of an optical disk drive adapter according to another embodiment of the present invention.

FIG. 4 is a plan view of the optical disk drive adapter of FIG. 3. FIG. 5 is a plan view of an optical disk drive adapter according to another embodiment of the present invention, which is similar to the optical disk drive adapter of FIG. 2 except for the number of elements.

FIG. 4 is a plan view of the optical disk drive adapter of FIG. 3 illustrating the positions and structures of the respective elements. While one subminiature optical disk 140 is mounted on one optical disk drive adapter in FIG. 4, a plurality of second rotating portions and force transmitting portions may be disposed and a plurality of subminiature optical disks may be mounted on the second rotating portions as shown in FIG. 5. In this case, a separate mechanism for moving the overall optical disk drive adapter according to the positions of the subminiature optical disks is required.

Subminiature optical disk drives are required to drive subminiature optical disks. Since the subminiature optical disk drives should be additionally purchased and are not widely distributed, the use of the subminiature optical disks have been limited. However, the present invention enables subminiature optical disks to be conveniently and easily used by mounting an optical disk drive adapter on a conventional standard optical disk drive, thereby reducing economic burden, increasing user convenience, and increasing the demand for subminiature optical disks.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical disk drive adapter comprising:
a first rotating portion disposed at the center of an optical disk drive and installing a turntable on which a standard optical disk is mounted;
a second rotating portion disposed beside the first rotating portion and installing a turntable on which a subminiature optical disk is mounted;
a force transmitting portion disposed between the first rotating portion and the second rotating portion and transmitting a rotary force between the first rotating portion and the second rotating portion;
a housing supporting the entire optical disk drive adapter so that the first rotating portion, the second rotating portion, and the force transmitting portions can be rotated on their axes while maintaining their overall shape; and
a housing upper plate having an adapter-like shape and protecting the first rotating portion, the second rotating portion, and the force transmitting portion.

2. The optical disk drive adapter of claim 1, wherein the first rotating portion, the second rotating portion, and the force transmitting portion are gears.

3. The optical disk drive adapter of claim 1, herein any one of the first rotating portion, the second rotating portion, and the force transmitting portion is connected to a spindle motor of the optical disk drive and receives the rotary force of the spindle motor.

4. The optical disk drive adapter of claim 1, wherein the first rotating portion and the second rotating portion have the same size and are rotated in the same direction.

5. The optical disk drive adapter of claim 1, wherein a plurality of second rotating portions and force transmitting portions are disposed and a plurality of subminiature optical disks are mounted on the second rotating portions.

6. The optical disk drive adapter of claim 1, wherein the second rotating portion allows the subminiature optical disk to be mounted thereon using a magnetic clamp.

7. The optical disk drive adapter of claim 1, wherein the housing upper plate has the same diameter as the housing and exposing the axis of the first rotating portion and the second rotating portion.

8. The optical disk drive adapter of claim 7, wherein the housing upper plate has a circular shape or a U-shape which is partially opened.

* * * * *